March 13, 1951
C. H. HOEPPNER ET AL
2,544,683
GAS TUBE CONTROL CIRCUIT
Filed Feb. 27, 1946
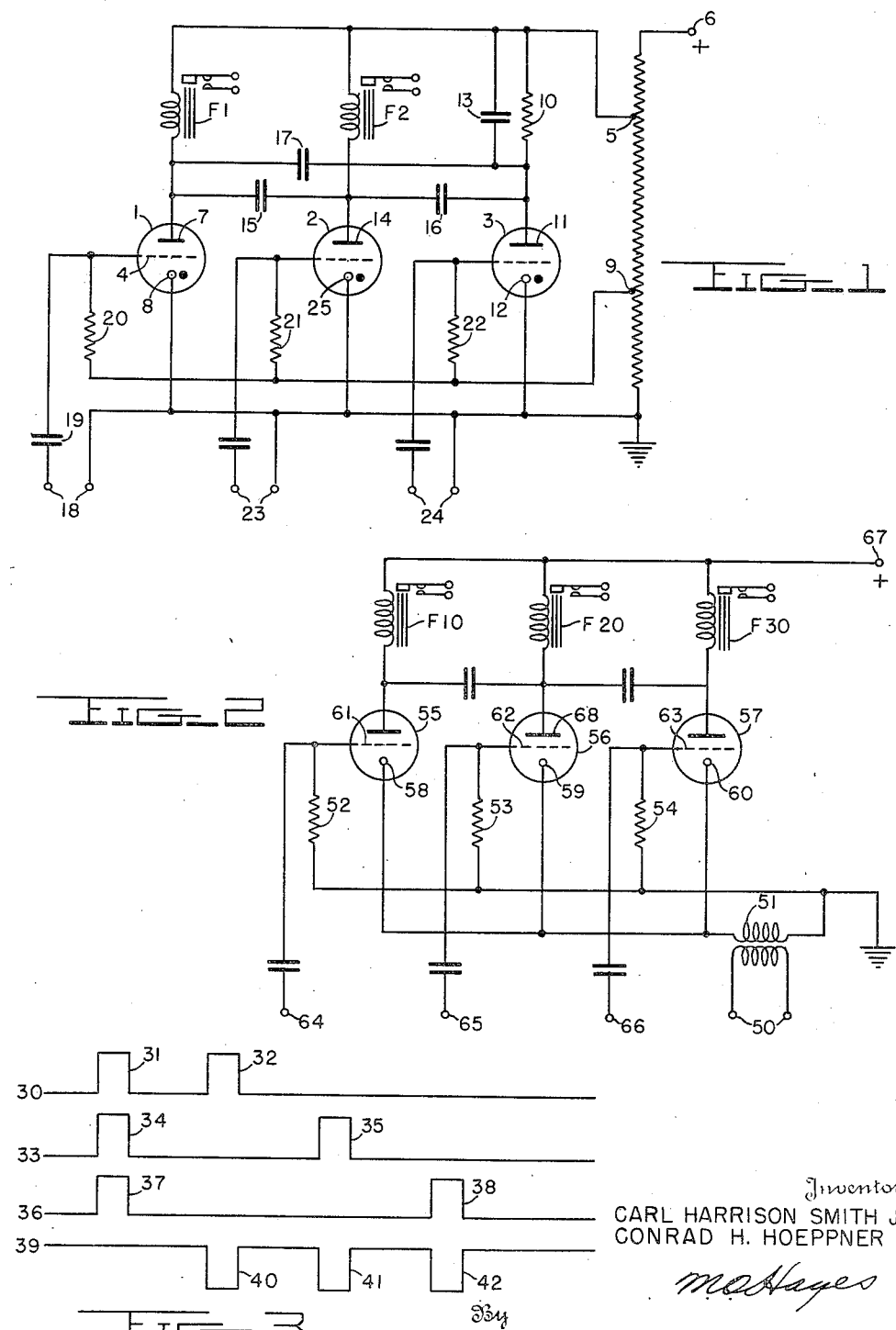
Inventors
CARL HARRISON SMITH JR.
CONRAD H. HOEPPNER
By M. O. Hayes
Attorney Patented Mar. 13, 1951

2,544,683

UNITED STATES PATENT OFFICE 2,544,683

GAS TUBE CONTROL CIRCUIT

Conrad H. Hoeppner, Washington, D. C., and Carl Harrison Smith, Jr., Arlington, Va.

Application February 27, 1946, Serial No. 650,581

5 Claims. (Cl. 250—27)

(Granted under the act of March 3, 1883, as amended April 30, 1928; 370 O. G. 757)

This invention relates broadly to electronic control circuits and in particular to control circuits employing gaseous discharge tubes.

The prior art has provided a wide variety of gaseous discharge tubes, one class of which has in common the feature of a control element which does not actively participate in the principal discharge once that principal discharge has been initiated. Into this class fall such tubes known to the trade as thyratrons, ignitrons, and cold cathode tubes. These particular tubes are enough alike in their basic properties to permit the statement that any type of circuit set up with one of these tubes can also be set up with either one of the others. Each, however, has its own particular operating characteristics which render it more suitable for certain applications than either of the others. For example, the thyratrons and the cold cathode gaseous discharge tubes may be used for control circuits to better advantage than the ignitron. Further, the cold cathode tube, where its limited current carrying capacity is not an obstacle, may be employed in such a manner as to require no quiescent anode power or cathode heating power.

It is an object of this invention to provide an electronic control circuit employing gaseous discharge tubes.

It is another object of this invention to provide an electronic control circuit which requires no standby power.

It is another object of this invention to provide an electronic circuit characterized by a plurality of states any one of which may be called into being without regard to the particular state previously existing.

It is another object of this invention to provide an electronic control circuit responsive to time modulated signals.

Other objects and features of this invention will become apparent upon a careful consideration of the following detailed description, when taken together with the accompanying drawings in which:

Figure 1 is the circuit diagram of one embodiment of this invention;

Figure 2 is the circuit diagram of a variant embodiment of this invention; and

Figure 3 is a series of waveforms useful in explaining the operation of the variant embodiment shown in Figure 2.

Among the principles upon which this invention is based are certain of those governing gaseous discharges. One of the principles is that, once a gaseous discharge between two electrodes has been established, the potential between those electrodes required for the support of that discharge is less than that required for its initiation, i. e., the discharge supporting potential is lower than the discharge initiating potential. Another of these principles is that the potential required to initiate a discharge is lowered when ionization is present in the gas. Still another is that a gaseous discharge between two electrodes may be extinguished if the potential between those electrodes is depressed below the discharge supporting potential for a long enough interval for de-ionization to occur and the discharge will remain extinguished even though the potential between the electrodes be subsequently increased above the discharge supporting value (but not attaining the discharge initiating value).

For an illustration of the manner in which these principles have been applied in a practical embodiment of this invention, reference is now had to Fig. 1. In this Fig. 1, tubes 1, 2, and 3 represent gaseous discharge tubes of the cold cathode type having three electrodes, it being understood that other gaseous discharge tubes of the same class may be substituted without substantial change in mode of operation. It is to be further understood that, while one of the three electrodes, typified by control electrode 4 of tube 1, is shown as having the grid structure as supplied in certain of such tubes (such as the RCA 1C21), this particular structure is not a limiting feature and other cold cathode tubes having a "starter-anode" control electrode (such as the RCA OA4G) rather than a "grid" control electrode may be employed. In tubes 1, 2, and 3 shown in Fig. 1, full advantage is taken of the glow discharge characteristic of such tubes to the extent that they do not require, in the quiescent state, cathode heating either direct or indirect. Further, potential source 5 of power supply 6 is of such a value that it will support a discharge between the principal discharge electrodes of the tubes, typified by electrodes 7 and 8 of tube 1, only if there is ionization present in the tubes. Still further, potential source 9 of power supply 6 is of such a value that it will not support a discharge between the control electrode (electrode 4 of tube 1, for example), and either of the associated principal electrodes. Thus, the fully quiescent condition of the circuit of Fig. 1 requires no power from power supply 6 for the electrodes and as mentioned above, no cathode heating power is required.

In the embodiment of Fig. 1, tube 1 has associated with it a utilization means responsive to the principal electrode discharge in the form of relay F1. Relay F1 is merely one form of such a utilization means, any means which responds to the flow of current when tube 1 discharges being suitable. Tube 2 has associated with it a similar utilization means responsive to a principal discharge in the form of relay F2. Relays F1 and F2 each correspond to separate functions, only one of which it is desired to employ at a time. Such functions might be that of causing a mechanism to speed up and to slow down. Or, relays F1 and F2 might correspond to the "right" and "left" controls in a remotely controlled aircraft. Obviously, only one of such functions should be instituted during any given interval.

The characteristics of relays F1 and F2 are such that they close when the tube to which they are connected discharges. Of the possible states which may characterize the circuit, one consists of none of the tubes discharging, another consists of tube 1 discharging, a third consists of tube 2 discharging and a fourth consists of tube 3 discharging. Of these four states, only the first three may exist other than temporarily. Resistor 10, in series with the principal discharge electrodes 11 and 12 of tube 3 is of such a magnitude that the value of potential source 5 is not great enough to support a continuous discharge in tube 3. It is characteristic of such gaseous discharge tubes that any current flow therein less than a critical minimum will not cause the ionization necessary to support discharge. Potential source 5 has such a magnitude that it is unable to supply a current greater than this critical minimum through the combined resistance of resistor 10 and tube 3. That potential source 5 is able to support a discharge in tube 3 even temporarily is made possible by the capacitance associated with resistor 10. This capacitance is represented in Fig. 1 by capacitor 13, it being understood that this may comprise an actual circuit element or it may, in certain cases, comprise only the distributed capacitance associated with the circuit. As soon as capacitor 13 charges, potential source 5 is unable to support a discharge in tube 3 and it is automatically extinguished.

Principal discharge electrodes 7 of tube 1, 14 of tube 2, and 11 of tube 3 are collectively coupled by non-conductive means. This space coupling in the embodiment shown is capacitative and is represented by capacitors 15, 16, and 17. Practice has shown that the capacitance of any two of these (15 and 16, for example) in series is sufficient to provide this collective coupling. Thus the third (17 in the example) may represent either an actual circuit element or merely the series capacitance of capacitors 15 and 16 between principal discharge electrode 7 of tube 1 and principal discharge electrode 11 of tube 3. Such coupling means provides that a potential change occurring at any one of the principal discharge electrodes 7, 14, or 11, is communicated to the remaining two principal electrodes without establishing such a change as a steady condition.

In operation, let it be assumed that none of the tubes is conducting and that it is desired to institute the function represented by relay F1. A signal applied at terminals 18 and communicated to control electrode 4 of tube 1 through capacitor 19 may, if of sufficient amplitude, and of either polarity, initiate a discharge between control electrode 4 and principal discharge electrode 8. Since control electrode 4 is already maintained at the positive potential of source 9 with respect to principal discharge electrode 8, the discharge initiating signal would most conveniently be of positive polarity. Once a discharge is initiated by the signal between electrodes 4 and 8, the condition of ionization which is a precedent to discharge between principal discharge electrodes 7 and 8 exists and this principal discharge is therefore initiated. Once initiated, the value of potential source 5 is sufficient to support the discharge of tube 1. Resistor 20, in series with potential source 9 and electrodes 4 and 8 is a current limiting impedance to limit current flow through grid electrode 4 to a safe dissipation value during the interval the discharge initiating signal occurs. Resistors 21 and 22 associated with tubes 2 and 3 each serve a similar purpose.

The supported discharge through tube 1 energizes relay F1 and its function is thereby instituted. Now let it be assumed that it is desired to institute the function represented by relay F2. A discharge initiating signal at terminals 23 will initiate the principal discharge in tube 2 and relay F2 will be energized in the same manner as was relay F1 in response to a signal at terminals 18. Electrode 14 of tube 2 will fall in potential from the value at source 5 to the discharge supporting potential, the remainder of the potential appearing across relay F2. The negative surge at electrode 14 will be communicated to electrode 7 of tube 1 through capacitor 15 and will reduce the potential at electrode 7 below that necessary to support discharge in tube 1. Capacitor 15 has been chosen of sufficient size to hold the potential of electrode 7 below the discharge supporting value for an interval of time which permits tube 1 to de-ionize. Thus, when capacitor 15 finally discharges to return electrode 7 above discharge supporting potential, the condition of ionization precedent to discharge in tube 1 no longer exists. It will be seen that a discharge initiating signal at terminals 24 will cause tube 3 to discharge and tube 2 to be extinguished. Further, it will be seen that, had tube 1 received a signal while tube 2 was discharging, tube 2 would have been extinguished. Thus, the initiation of discharge in any one of the tubes renders the remaining tubes incapable of supporting a discharge. While the tubes appear as a sequence in physical disposition, their operation is not sequential since there is no particular order in which the tubes must be caused to discharge. For example, relay F1 may be energized without regard to the presence of a discharge in tube 2. Likewise, relay F2 may be energized without regard to the presence of a discharge in tube 1. Were there a third and similar relay associated with tube 3 and responsive to conduction therein, it could be energized without regard to the presence of a discharge in either tube 1 or tube 2. While such an arrangement might be of advantage in a situation in which no importance is attached to the matter of standby power requirement, and in a circuit corresponding to three non-simultaneous functions, there is associated with tube 3, rather than a relay, the impedance means comprising resistor 10 and capacitor 13. This impedance means provides for the condition in which neither relay F1 or F2 is to be energized. Since no utilization means is associated with tube 3, it may be caused to discharge and thereby render the other two tubes incapable of supporting a discharge. Having fulfilled its mission, there is no purpose in a continuous discharge by tube 3 and its temporary nature has been secured as hereinbefore described. One advantage of providing temporary discharge tube 3 is that a situation might otherwise accidentally occur in which all the tubes were discharged simultaneously and the circuit held unresponsive to signals at any of the three input points 18, 23, or 24. It should be pointed out here that the number of tubes, such as tubes 1 and 2, with which utilization means are associated is not limited to two as shown in Fig. 1 but may comprise several more in addition if more than two non-simultaneous functions are desired.

Illustrative of certain of the possible arrangements and of a variant embodiment of this invention is the circuit of Fig. 2. This variant embodiment is particularly useful for control purposes in a control system employing time modulation for function selection. In one type of such a control system as described by Claud E. Cleeton and Ernst H. Krause in copending application S. N. 593,174 entitled "Pulse Signaling System" filed May 11, 1945, there is produced at the "master" or controlling source, a state selecting pulse group comprising an initial signal marking an instant in time and one or more subsequent signals predeterminedly time related to the initial pulse in such a manner that the time relation defines the state or states to be selected. Each one of the subsequent signals may have any one of several time relations to the initial signal, said time relations defining one particular group of non-simultaneous functions. In a guided missile control system, for example, such a group of non-simultaneous functions or states might comprise "right," "left," "neutral," or "dive," "climb," and "level." For purposes of simplicity, let it be assumed that only one group of functions be controlled by the master and that these be designated as F10, F20, and F30. At the "slave," or receiving end, of the control system, the time modulated pulse group received comprises an initial signal followed by a single subsequent signal which may have any one of three distinct time relations to the initial signal, each corresponding to a respective one of the three states F10, F20, or F30. There is produced by the slave, in response to the initial signal of the pulse group, a series of signals, each on a separate circuit channel and each marking, with respect to the received initial signal, a particular one of the time relations defining the selectable states. The signals in this series may be employed for bias reducing purposes as will be explained in the following paragraphs.

In Fig. 3, to which reference is now had, a series of waveforms have been plotted with voltage amplitude on the vertical scale against time on the horizontal scale. Waveform 30 is illustrative of a received pulse group which has been dispatched for the purpose of initiating the state corresponding to function F10. Of this waveform 30, signal 31 marks the reference instant in time and signal 32 by its time relation to signal 31 defines function F10. Waveform 33 is similarly constituted but with the time relation between reference signal 34 and subsequent signal 35 which defines the state corresponding to F20. Waveform 36 similarly defines state F30. Waveform 39 represents the series of signals produced by the slave in response to initial signal 31, 34 or 37, it being understood that each signal 40, 41, and 42 appears on a separate circuit channel in the system. It will be noted that signal 40 marks the time relation of the signal defining F10, signal 41 the time relation defining F20, and 42 the time relation marking F30.

Now, with joint reference to Figs. 2 and 3, terminals 50 of Fig. 2 indicate the point of application of state defining pulse group 30, 33, or 36 as the case may be. It will be seen that transformer 51 and the branching circuits containing resistances 52, 53, and 54 represent a means common to all three tubes 55, 56, and 57 for applying signals between respective principal discharge electrodes 58, 59, and 60 and respective control electrodes 61, 62, and 63. With the polarity shown in waveforms 30, 33, and 36, the principal discharge electrodes are driven positive by these signals with respect to the control electrodes. The amplitude of these signals is limited, however, to a value below that capable of initiating a discharge between the respective principal discharge electrodes and the control electrodes. It will also be seen that terminals 64, 65, and 66 each represents a separate means for applying signals between the respective principal discharge and control electrodes. To terminal 64 may be applied signal 40 of waveform 39, to terminal 65 may be applied signal 41 and to terminal 66 may be applied signal 42. The polarity of signals 40, 41 and 42 is such as to drive the control electrode to which applied, negative with respect to the corresponding principal discharge electrode. Their amplitude is insufficient to initiate discharge between the two electrodes but they do serve as bias reducing signals which allow the signals applied at terminals 50 to initiate a discharge in a selected one of the three tubes.

For example, let it be assumed that it is desired to cause the state to exist in which tube 56 discharges, corresponding to function F20. The pulse group represented by waveform 33 is therefore applied at terminals 50. In chronological order, signal 34 appears between the two electrodes of each tube as described but fails to initiate a discharge. Signal 40 next appears between electrodes 58 and 61 of tube 55 but fails to initiate a discharge. Next signal 35 is applied to all tubes but signal 41 is applied only to tube 56. The reinforcement of bias reducing signal 41 and discharge initiating signal 35 causes tube 56 only to discharge and call into being the state corresponding to function relay F20 which registers the selected state. Finally signal 42 is applied at terminal 66 but is helpless in the absence of a discharge initiating signal at terminals 50.

As described in connection with Fig. 1, the initiation of a discharge between electrodes 59 and 62 supplied the ionization necessary to permit the value of potential source 67 to initiate the principal discharge between electrodes 59 and 68. The mere fact that, for the duration of discharge initiating signal 35, electrode 59 was driven positive so as to decrease the potential between it and electrode 68 does not operate to prevent potential source 67 causing a principal discharge since potential source 67 and signals applied at terminals 50 may be chosen of such values that a principal discharge will be initiated in spite of the presence of the terminal 50 signal if ionization is present in the tube. In any event the tube does not de-ionize instantaneously and the residual ionization upon the disappearance of signal 35 may be made to allow the principal discharge.

To those versed in the art it will be apparent that if the state represented by function relay F30 be one which is caused to exist when none of the three tubes is discharging, an impedance means associated with tube 57 in place of function relay F30 similar to the impedance means associated with tube 3 of Fig. 1, will introduce the feature of no standby power requirement. It will be further apparent that tubes 55, 56 and 57 may be supplemented by additional tubes similarly arranged as long as such tubes correspond to non-simultaneous functions. This naturally points to the situation in which additional circuits similar to that shown in Fig. 2 are employed for other separate groups of non-simultaneous functions. In the latter case, the same series of bias reducing signals as shown by waveform 39 may, if extended, be employed for all control circuits.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A control circuit comprising, a plurality of gaseous discharge tubes, space coupling means connecting all said tubes together operative responsively to discharge in any tube to terminate discharge in any other conducting tube, separate input connections for each of said tubes for applying discharge initiating signals to said tubes, means connected to at least one of said tubes for rendering it capable of supporting only a temporary discharge, and a plurality of utilization means, each of said utilization means being connected to a corresponding one of the remaining tubes and responsive to the discharge thereof.

2. A control circuit comprising, a plurality of gaseous discharge tubes each having at least two principal discharge electrodes and a control electrode, capacitive coupling means connected between one principal discharge electrode of each of said tubes and the corresponding principal discharge electrode of each of the other of said tubes operative responsively to discharge in any tube to terminate discharge in any other conducting tube, separate signal input connections for each of said tubes for applying discharge initiating signals selectably to said tubes, and means connected to one of said tubes for rendering the same capable of maintaining only a temporary discharge.

3. A control circuit comprising, a plurality of gaseous discharge tubes each having at least two principal discharge electrodes and a control electrode, a source of potential of a value capable of supporting discharge between the two principal electrodes of any of said tubes only when ionization exists therein, said two principal discharge electrodes of each of said tubes being connected in series with said source of potential, capacitive coupling means connected between the first of said two principal discharge electrodes of each of said tubes and the corresponding principal discharge electrode of each of the other of said tubes operative responsively to discharge in any tube to terminate discharge in any other conducting tube, separate signal input connections for each of said tubes for applying discharge initiating signals between the second of said two principal discharge electrodes and the control electrode of each of said tubes, and means connected to one of said tubes for rendering the same capable of maintaining only a temporary discharge.

4. A control circuit comprising, a plurality of gaseous discharge tubes of the cold cathode type each having at least two principal discharge electrodes and a control electrode, a source of potential of a value capable of supporting discharge between the two principal electrodes of any of said tubes only when ionization exists therein, said two principal discharge electrodes of each of said tubes being connected in series with said source of potential, capacitive coupling means connected between the first of said two principal discharge electrodes of each of said tubes and the corresponding principal discharge electrode of each of the other of said tubes operative responsively to discharge in any tube to terminate discharge in any other conducting tube, separate signal input connections for each of said tubes for applying discharge initiating signals between the second of said two principal discharge electrodes and the control electrode of each of said tubes, impedance means connected in series with the two principal discharge electrodes of one of said tubes and said source of potential for rendering said source of potential capable of supporting only a temporary discharge between last said two principal discharge electrodes, and a plurality of utilization means each connected to a selected one of the remaining of said tubes and responsive to discharge between the two principal electrodes thereof.

5. A control circuit comprising three gaseous discharge tubes of the cold cathode type each having at least two principal discharge electrodes and a control electrode, a first source of potential of a value capable of supporting discharge between the two principal electrodes of any of said tubes only when ionization exists therein, said two principal electrodes of each of said tubes being connected in series with said source of potential, capacitive coupling means connected between the first of said two principal discharge electrodes of each of said tubes and the corresponding principal discharge electrode of each of the other of said tubes operative responsively to discharge in any tube to terminate discharge in any other conducting tube, a second source of potential of a value slightly lower than that capable of supporting discharge between the second of said two principal discharge electrodes and the control electrode of any of said tubes, last said principal discharge electrode and said control electrode of each of said tubes being connected in series with said second source of potential, separate signal input connections for each of said tubes for applying discharge initiating signals between last said principal discharge electrode and the control electrode thereof, impedance means connected in series with the two principal electrodes of the first of said tubes and said first source of potential for rendering said first source of potential capable of supporting only a temporary discharge between last said two principal electrodes, and separate relay means connected to each of the second and third of said tubes, each of said relay means being responsive to discharge between the two principal electrodes of its associated tube.

CONRAD H. HOEPPNER.
CARL HARRISON SMITH, Jr.

REFERENCES CITED

The following references are of record in the file of this patent:

UNITED STATES PATENTS

| Number | Name | Date |
| --- | --- | --- |
| 2,092,861 | Swart | Sept. 14, 1937 |
| 2,162,508 | Knowles | June 13, 1939 |
| 2,292,100 | Bliss | Aug. 4, 1942 |
| 2,404,565 | Bumstead | July 23, 1946 |

FOREIGN PATENTS

| Number | Country | Date |
| --- | --- | --- |
| 108,213 | Great Britain | Aug. 2, 1917 |